March 28, 1950 W. L. McGRATH 2,502,165
CONDUIT FITTING FOR AIR CONDITIONING SYSTEMS
Filed Oct. 10, 1946 2 Sheets-Sheet 1

INVENTOR.
William L. McGrath
BY

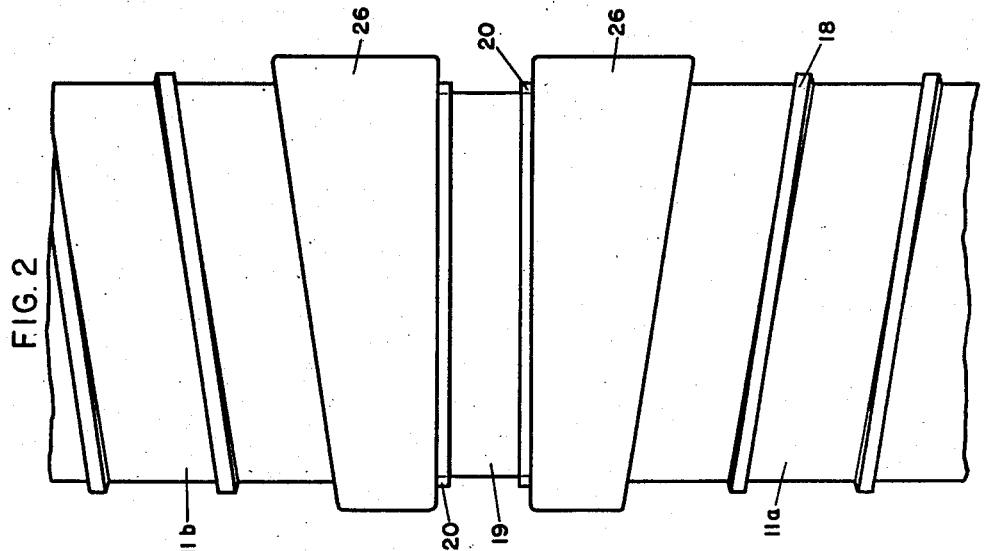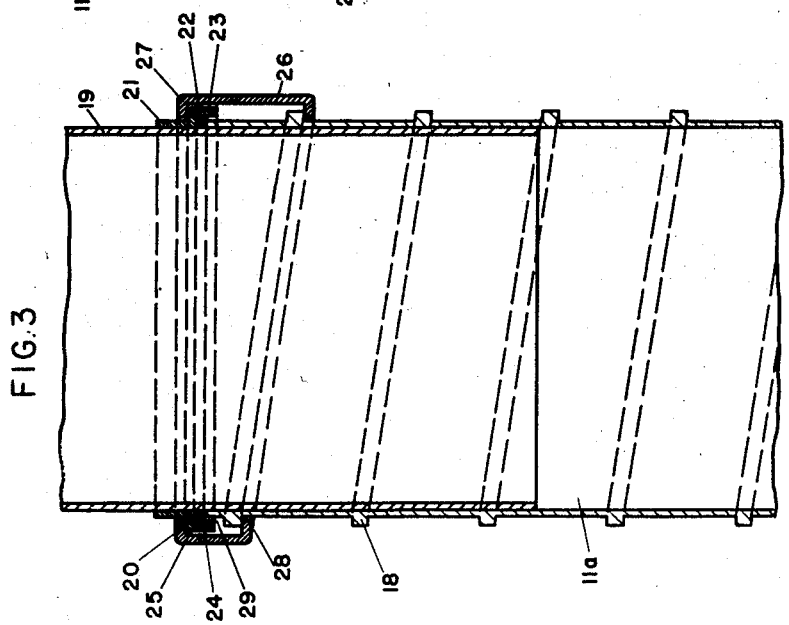

Patented Mar. 28, 1950

2,502,165

UNITED STATES PATENT OFFICE 2,502,165

CONDUIT FITTING FOR AIR-CONDITIONING SYSTEMS

William L. McGrath, Syracuse, N. Y., assignor to Carrier Corporation, Syracuse, N. Y., a corporation of Delaware Application October 10, 1946, Serial No. 702,398

6 Claims. (Cl. 138—25)

This invention relates to air conditioning systems and more particularly to an air conditioning system including conduits for conducting air from conditioning equipment to a plurality of distributing units disposed in the areas to be conditioned having connections or joints between members forming the conduits substantially sealed to prevent the escape of conditioned air and so formed as to impart strength and rigidity to the structure.

In Carrier Patent No. 2,363,294, granted November 21, 1944, there is disclosed an air conditioning system in which air is conditioned at a central conditioning point and delivered at a relatively high static pressure (in excess of 1" water gauge) and at relatively high velocity (3,000 to 5,000 feet per minute) to a plurality of units disposed in and serving a plurality of areas or enclosures to be conditioned. The high pressure air supplied to each unit is discharged therein through nozzle formations or the like and in this manner induces a relatively great circulation of air withdrawn from the area served by the unit. The primary or high pressure air and secondary or induced air are then supplied to the area. Coils are furnished in the units and are supplied with conditioning medium to temper the induced air.

It will be appreciated an air conditioning system involving the use of conditioned air at relatively high static pressure and at relatively high velocity requires that the conduits supplying the air from the place of conditioning to the point of distribution to be substantially leakage proof. This is a difficult problem for air conditioning systems of this type are extensively employed in multi-storied buildings and consequently the conduits need to be formed of many sections. To prevent escape of conditioned air under conditions of high static pressure and velocity, it is essential that the connections between the various sections of the conduits be securely sealed. In addition, such connections must possess structural rigidity and be capable of ready installation with minimum labor and material costs.

The chief object of this invention is to provide an air conditioning system including substantially sealed joints between the various members forming the conduits, the joints possessing requisite strength and rigidity and being capable of ready construction at low cost.

An object of the invention is to provide an air conditioning system including a novel and improved construction connecting the various sections of the conduits supplying air from the conditioning equipment to the place of distribution.

A further object is to provide a substantially leakage proof conduit for use in an air conditioning system composed of a plurality of sections and being securely sealed at the places where such sections are joined to permit the passage of air therethrough at high static pressure and high velocity without permitting escape of air from the conduit.

A still further object is to provide an improved joint for the conduits of air conditioning systems. Other objects of my invention will be readily perceived from the following description.

This invention relates to an air conditioning system which comprises means for conditioning air, units disposed in a plurality of areas to be conditioned for distributing air in such areas, and a conduit for conducting air from the conditioning means to a plurality of distributing units, said conduit including a plurality of tubing members, each tubing member consisting of material formed in a plurality of helices, adjacent helices of each tubing member having an interlocking connection forming a helically extending thread, and joints formed between adjacent tubing members aligning the members for passage of air through the conduit, each joint comprising a sleeve member adapted to extend within the tubing members, a rotatable member extending about the sleeve having an inwardly extending flange, a second inwardly extending flange upon said rotatable member, said second flange having a pitch similar to the pitch of the tubing thread and being adapted to engage the thread of the tubing, and sealing means disposed between the first flange of the rotatable member and the edge of the tubing, rotation of said member in engagement with the thread of the tubing compressing the sealing means to prevent escape of air through the joint.

The attached drawing illustrates a preferred embodiment of my invention, in which:

Figure 2 is a view in side elevation of the conduit at a joint; and

Figure 3 is a sectional view of the conduit at a joint.

Figure 1:
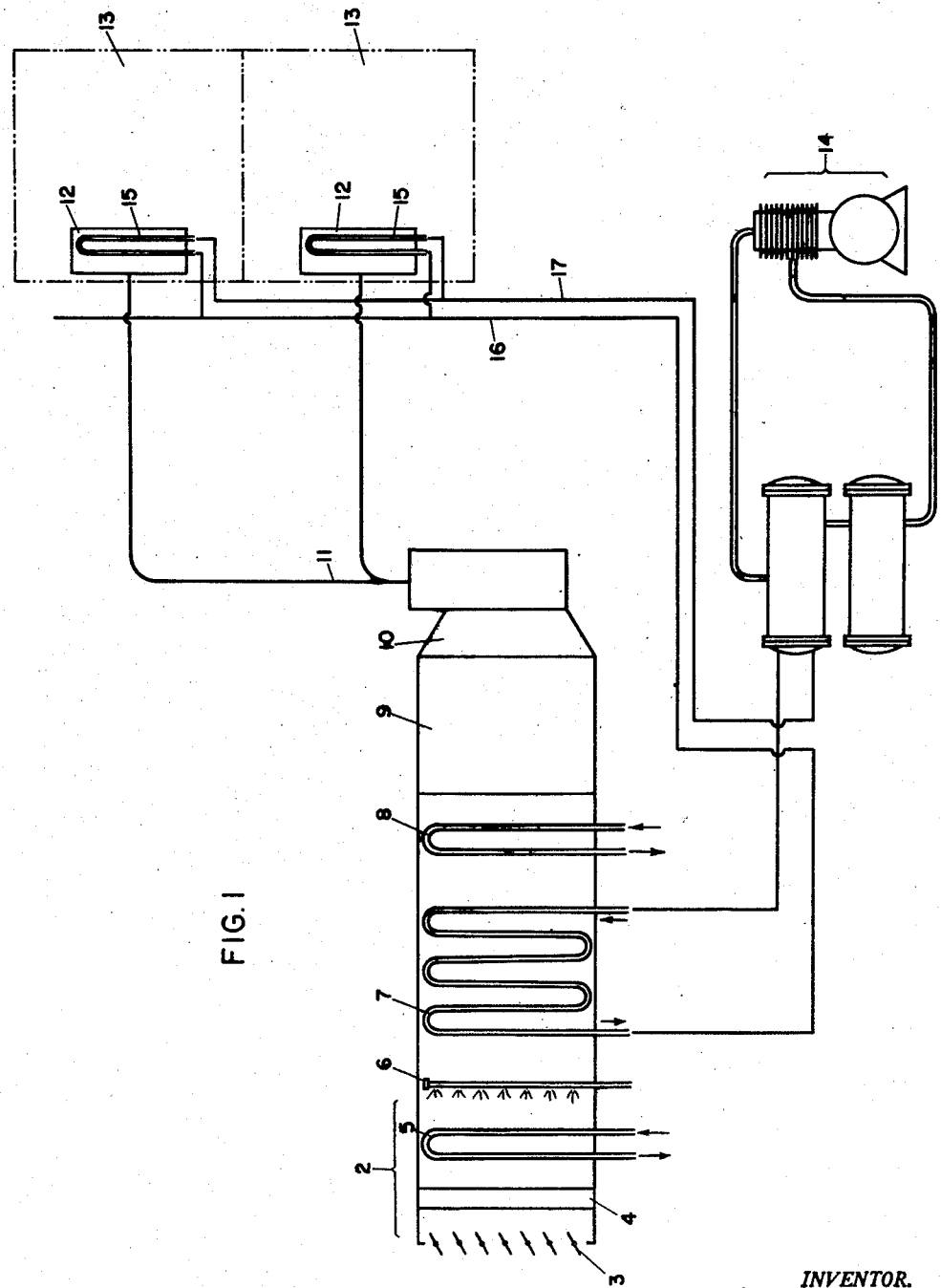
Figure 1 is a diagrammatic view of the air conditioning system of my invention.

Referring to the drawing, there is disclosed an air conditioning system employing the present invention. The air conditioning system consists of suitable equipment designated generally at 2 for conditioning air to be supplied to areas being conditioned. Equipment 2 may include dampers 3 through which exterior air is drawn into the equipment, a filter 4, preheating coil 5, sprays 6, dehumidifying coil 7, a reheated coil 8, plenum 9 and a fan 10; fan 10 is adapted to draw air through equipment 2 and supply it through conduits 11 at high static pressure and at high velocity to the various induction units 12 disposed in areas 13 to be conditioned. Fan 10 may supply such conditioned air at a static pressure in excess of 1" water gauge and at a velocity in the order of 3,000 to 5,000 feet per minute.

Such a system is particularly adapted for use in conditioning large buildings and consequently the conduits 11 may be formed of a plurality of sections which must be aligned satisfactorily and sealed at the connections or joints.

Suitable refrigeration equipment 14 is provided to furnish conditioning medium to coil 7 of equipment 2 and to supply conditioning medium to coils 15 of units 12 as is well known in the art. Supply lines 16 supply the conditioning medium to coils 15 while return lines 17 return the conditioning medium after its passage through coils 15 to equipment 14 if desired or may discharge the return conditioning medium to a waste line or drain.

Referring to Figures 2 and 3, there is illustrated the manner in which the various sections or tubing members 11A and 11B forming conduit 11 are joined to insure leakage proof joints between the various sections. Tubing members 11A and 11B are each composed of a single piece of material formed in a plurality of helices, adjacent helices of each tubing member having interlocking connections forming a helically extending exterior thread 18. Tubing of this type may be manufactured in accordance with Patents Nos. 1,841,300 and 1,918,137, granted January 12, 1932, and July 11, 1933, respectively.

A sleeve member 19 is provided adapted to extend within adjacent tubing members 11A and 11B. A bracket 20 is disposed in position about sleeve 19. Bracket 20 includes a vertically extending flange 21, preferably, disposed adjacent sleeve 19, a horizontally extending section 22 terminating in a downwardly extending flange 23 and forming in effect a pocket 24 for the reception of a compressible ring gasket or washer 25.

A rotatable member 26 in the form of a turn collar extends about sleeve 19. Collar 26 is provided with an inwardly extending flange 27 adapted to fit over section 22 of bracket 20. Collar 26 is provided with a second flange 28 having a pitch similar to the pitch of the tubing thread 18 and being adapted to cooperate with thread 18 to secure the sleeve in place in the structure. Rotation of ring collar 26 compresses gasket 25 between the lower surface of flange 22 of bracket 20 and the edge 29 of an adjacent tubing member. Compression of the gasket between such portions securely seals the joint and prevents escape of air from the conduit even though the air be conducted therethrough under conditions of high static pressure and high velocity.

In erecting the conduit for use in the air conditioning system of my invention the sleeve 19 carrying bracket 20 and including gasket 25 disposed in pocket 24 is fitted within an adjacent tubing member, for example, tubing member 11A as shown in Figures 2 and 3. Ring collar 26 is then disposed about the sleeve 19, flange 27 resting over and being in engagement with section 22 of bracket 20 and its flange 28 engaging and fitting under the thread 18 of the tubing member 11A to secure the turn collar to the tubing member; continued rotation of collar 26 in engagement with thread 18 compresses gasket 25 between the lower surface of section 22 and the edge 29 of the tubing member, preferably deforming the gasket and forcing it into secure sealing relation with the walls of pocket 24 and the edge of tubing member 11B to prevent escape of air from the conduit. Similar means may be employed to form a joint between the opposite end of the sleeve 19 and the second tubing member 11B.

The present invention provides a secure seal at the joints formed by various sections of conduits employed in air conditioning systems. Such joints are substantially leakage proof even though the conduit be used for the passage of conditioned air at high static pressure and at high velocity. The construction so provided is strong and rigid, is capable of rapid and easy construction, and is low in initial cost. The air conditioning system so provided permits the supply of conditioned air at high velocity and high static pressure to the areas to be conditioned without leakage or loss of such air and provides a considerable decrease in the initial cost and operating costs of the system. It will be understood the joint construction so described is not restricted to use in air conditioning systems but may be employed wherever a joint need be formed connecting lengths of spiral tubing.

While I have described and illustrated a preferred embodiment of my invention, it will be understood my invention is not limited thereto since it may be otherwise embodied within the scope of the following claims.

I claim:

1. A substantially leakage proof sectional conduit, which comprises a plurality of tubing members, each tubing member comprising material formed in a plurality of helices, adjacent helices of each tubing member being so connected as to form a helically extending thread, and joints formed between adjacent tubing members aligning the members for the passage of fluid through the conduit, each joint comprising a sleeve member adapted to extend within the tubing members, a rotatable member extending about the sleeve having an inwardly extending flange, and a second inwardly extending flange on said rotatable member, said second flange having a pitch similar to the pitch of the tubing thread and being adapted to engage the thread of the tubing and sealing means disposed between the first flange of the rotatable member and the edge of the tubing, rotation of the rotatable member in engagement with the thread of the tubing compressing the sealing means to prevent escape of air through the joint.

2. A substantially leakage proof sectional conduit for use in an air conditioning system, which comprises a plurality of tubing members, each tubing member comprising a single piece of material formed in a plurality of helices, adjacent helices of each tubing member having an interlocking connection forming a helically extending exterior thread, and joints formed between adjacent tubing members aligning the members for the passage of air through the conduit, each joint comprising a sleeve member adapted to extend within the tubing members, a turn collar extending about the sleeve having an inwardly extending flange, a second inwardly extending flange on said collar, said second flange having a pitch similar to the pitch of the tubing thread and being adapted to engage the exterior thread of the tubing, and sealing means disposed between the first flange of the turn collar and the edge of the tubing, rotation of the collar in engagement with the thread of the tubing compressing the sealing means to prevent escape of air through the joint.

3. A substantially leakage proof joint for risers of an air conditioning system which comprises a sleeve member having its end portions adapted to fit within adjacent tubing members of the riser, each of the adjacent tubing members comprising a single piece of material formed in a plurality of helices, helices of each tubing member forming a helically extending exterior thread, a rotatable member extending about the sleeve having an inwardly extending flange, a second inwardly extending flange on said rotatable member, said second flange forming a thread having a pitch similar to the pitch of the tubing thread and being adapted to cooperate with the thread of the tubing member to secure the sleeve to said tubing member, and sealing means disposed between the first flange of the rotatable member and the edge of the tubing, rotation of the rotatable member in engagement with the thread of the tubing compressing the sealing means to prevent escape of air through the joint.

4. A substantially leakage proof joint which comprises a sleeve member having its end portions adapted to fit within adjacent tubing members, each of the adjacent tubing member comprising a single piece of material formed in a plurality of helices, adjacent helices of each tubing member having an interlocking connection forming a helically extending exterior thread, a bracket member disposed about the sleeve forming a pocket for the reception of sealing means, sealing means in said pocket, a rotatable member extending about the sleeve having an inwardly extending flange in engagement with said bracket member, and a second inwardly extending flange on said rotatable member, said second flange forming a thread having a pitch similar to the pitch of the tubing thread and being adapted to cooperate with the thread of the tubing member to secure the sleeve to the tubing member, rotation of the rotatable member in engagement with the thread of the tubing compressing the sealing means between the bracket member and the edge of the tubing member to prevent escape of air through the joint.

5. A substantially leakage proof joint which comprises a sleeve member having its end portions adapted to fit within adjacent tubing members, each of the adjacent tubing members comprising a single piece of material formed in a plurality of helices, adjacent helices of each tubing member being so connected as to form a helically extending exterior thread, a bracket member disposed about the sleeve, a rotatable member extending about the sleeve having an inwardly extending flange in engagement with said bracket member, and a second inwardly extending flange on said rotatable member, said second flange having a thread adapted to engage the thread of said tubing member to secure the sleeve to the tubing member.

6. A substantially leakage proof joint for risers of an air conditioning system which comprises a sleeve member having its end portions adapted to fit within the adjacent tubing members of the riser, each of the adjacent tubing members comprising a single piece of material formed in a plurality of helices, helices of each tubing member forming a helically extending exterior thread, a bracket member disposed about the sleeve forming a pocket for the reception of sealing means, sealing means disposed in said pocket, a rotatable member extending about the sleeve having an inwardly extending flange and a second inwardly extending flange on said rotatable member; said second flange forming a thread having a pitch similar to the pitch of the tubing thread and being adapted to cooperate with the thread of the tubing member to secure the sleeve to said tubing member, rotation of the rotatable member in engagement with the thread of the tubing compressing the sealing means to prevent escape of air through the joint.

WILLIAM L. McGRATH.

REFERENCES CITED

The following references are of record in the file of this patent:

UNITED STATES PATENTS

| Number | Name | Date |
|---|---|---|
| 1,595,310 | Mueller et al. | Aug. 10, 1926 |
| 1,841,300 | Scarritt | Jan. 12, 1932 |
| 1,992,503 | Penick et al. | Feb. 26, 1935 |
| 2,072,427 | O'Brien | Mar. 2, 1937 |
| 2,112,520 | Crawford | Mar. 29, 1938 |
| 2,253,628 | Krapp | Aug. 26, 1941 |

Certificate of Correction

Patent No. 2,502,165                                                    March 28, 1950

WILLIAM L. McGRATH

It is hereby certified that errors appear in the printed specification of the above numbered patent requiring correction as follows:

Column 3, line 3, for the word "reheated" read *reheater*; column 5, line 31, for "member" read *members*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*